P. & J. McHALE.
BELT FASTENER.
APPLICATION FILED JUNE 6, 1908.

924,490.

Patented June 8, 1909.

WITNESSES:
Fisher H. Pearson
Geo. P. Longfellow.

Philip McHale  INVENTORS
James McHale
BY
Gardner W. Pearson
ATTORNEY.

UNITED STATES PATENT OFFICE.

PHILIP McHALE AND JAMES McHALE, OF LOWELL, MASSACHUSETTS, ASSIGNORS OF ONE-THIRD TO EARLE K. ATWOOD, OF LOWELL, MASSACHUSETTS.

BELT-FASTENER.

No. 924,490.      Specification of Letters Patent.      Patented June 8, 1909.

Application filed June 6, 1908. Serial No. 437,163.

*To all whom it may concern:*

Be it known that we, PHILIP McHALE and JAMES McHALE, both citizens of the United States, residing at Lowell, in the county of Middlesex and State of Massachusetts, have invented certain new and useful Improvements in Belt-Fasteners, of which the following is a specification.

Our invention relates to fasteners for connecting driving belts or the ends of driving belts made of leather, canvas, or other similar material. Our device is a metallic buckle consisting of two parts hinged together in such a way that it allows nothing but the surface of the belt to come in contact with the pulley and will allow the belt to conform to the curved surface of the pulley to such an extent that very little power is lost. We are aware that many metal belt fasteners with projecting teeth are in use, but where a single plate is used, there are a number of disadvantages, which we overcome. If a straight single plate is used, it does not conform to the curve of the surface of the pulley and the belt tends to separate therefrom. If a curved single plate is used, there is a bending of the leather at each edge of the plate every time the plate passes from a pulley into a straight stretch of the belt, and this bending eventually results in the belt breaking at that point. We are aware that hinged fasteners are used wherein the pivotal line is at the outside of the belt. These fasteners, on account of the pull of the belt not being in line with the pivot, tend to bend in the wrong direction, that is away from the pulley instead of toward it.

Our device consists of a hinged or pivoted metal belt buckle provided with belt teeth which enter the ends of the belt. It is so constructed that it cannot bend toward the pulley but can readily bend away from it. It is so arranged that no metal part touches the pulley at any time whereby slipping and wearing are avoided. It can be readily taken apart and put together, which makes it easier to take up the belt.

Figure 1:
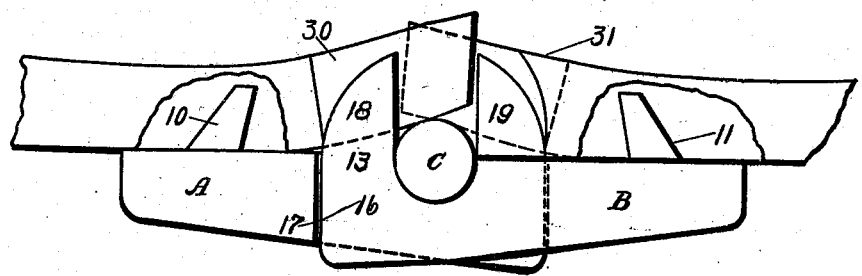
Figure 2:
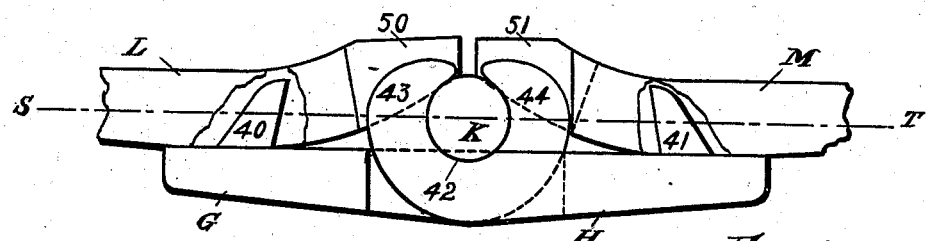
Figure 3:
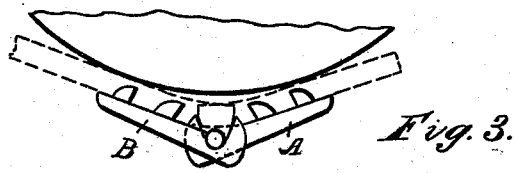
Figure 4:
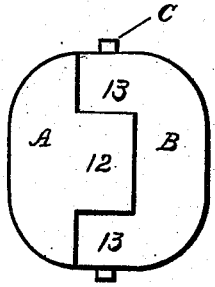
Figure 5:
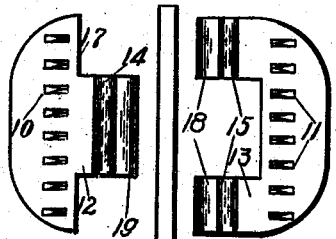
Figure 6:
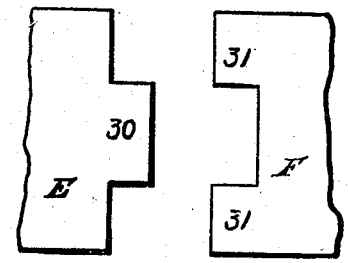

In the drawings, Figure 1 is an enlarged side view of the device, the belt being shown in place. Fig. 2 shows another form of the device also enlarged. Fig. 3 shows the device passing under a pulley and the way in which it bends. Fig. 4 is an outside view of the device with the parts in place. Fig. 5 is an inside view of the device with the parts separated. Fig. 6 shows the manner in which the ends of the belt are cut to fit the belt buckle.

Our device consists of an open hinged belt buckle and comprises the interlocking plates A and B and hinge pin C. The plate A comprises preferably one row of teeth 10 although two or more rows as shown in Fig. 3, may be used if desired. Plate B carries similar teeth 11. The outer edges of plates A and B are preferably curved. Plate A has a tongue 12 which forms part of the hinge knuckle and which fits between similar tongues 13, 13 of plate B which form the rest of the knuckle. On the inside face, that is the face where are the teeth and which is next to the belt, tongue 12 is provided with a transverse groove 14 which registers with similar grooves 15 in tongues 13, 13, of plate B. These grooves are of a size to receive hinge pin C, with an easy fit.

The outer ends 16 of tongues 13 of plate B which rest against plate A at 17, are cut straight and abut on the end 17 of plate A which is also straight. This straight portion 16 runs inward to a point where it joins at a tangent the outer line of shoulders 18 which is struck on a curve, the center of which is the center of groove 15. Shoulders 18 project inward from tongues 13, 13.

The outer portion of tongue 12 of plate A and the adjoining portion of plate B are cut square and abut in the same way. The outer curved face of shoulder 19 is formed with the same center as groove 14. Shoulder 19 projects inward from tongue 12 of plate A. By making the outer surfaces of shoulders 18 and 19 on curves, the center of which is the center of grooves 14 and 15 and therefore of pin C when in place, the shoulders do not interfere with the inward bending of the belt buckle. The adjacent faces of shoulders 18 and shoulder 19 are substantially at right angles to the inner surface of plates A and B.

It will be seen that when hinge pin C is passed through grooves 14 and 15, a hinge is formed which can bend inward as shown in Fig. 3 but cannot bend outward on account of the abutting straight surface of tongues 13, 13 and square end 17 of plate A, and the corresponding straight abutting surfaces on tongue 12 and plate B.

E represents one end of the belt which is cut with a tab 30 to correspond with and extend over the groove 14 in tongue 12 of plate A as far as preferably to abut against the adjoining straight surface of shoulder 19. This tab 30 rests on pin C and preferably against shoulder 19 as shown in Fig. 1. The other end F of the belt is cut with tabs 31, 31 which fit over the grooves 15, 15 in tongues 13, 13 of plate B and rest also on pin C and against shoulders 18. These tabs on the belt keep pin C in place and also prevent any part of the buckle from striking the pulley. The height of shoulders 18 and 19 above pin C should be a little less than the thickness of the belt which is to be joined.

To put in place, teeth 10 of plate A are driven into the end E of the belt and teeth 11 of plate B are driven into the end F of the belt, after which the belt is passed over the pulleys, the two ends are brought together and pin C is pushed in sidewise through grooves 15 and 14 and under tabs 30, 31, 31, thus holding the parts in place.

Teeth 10 and 11 should not be so long as to pass through the belt but should pass into it far enough to hold.

In Fig. 2 we show a slightly modified form of our device, wherein G represents one plate provided with teeth 40 and H represents another plate provided with teeth 41. In this form there is no groove whatever or, if any, a very shallow one as 42, but the respective knuckles or shoulders 43 and 44 are curved up and around so as to form a bearing for pin K. In this construction, it will be seen that the pull of the belt L M will be directly through its center, which coincides with the center of pin K, as see the dotted line S. T. For this reason, there is no tendency for the buckle to bend, unless it is forced to do so by passing over a pulley. For this reason it is not necessary to make the adjoining ends of the tongues and plates square, as at 16, 17 in Fig. 1.

In either construction, the ends of the belt which rest on the hinge pin may be shaved down as shown at 50 and 51, Fig. 2 but the lump caused by these ends resting on the hinge pin is really not objectionable as a glance at Fig. 3 will show. As the hinge bends in passing over a pulley, the lumps blend together and cause the inside angle between the two hinge plates to become a curve which almost or quite conforms to the curve of the pulley.

Our invention consists in the use of a belt buckle with an open knuckle and which can be instantly separated, which does not allow any metal parts to touch the pulley and which can not bend in such a way as to wear out the belt.

The removable pin permits the belt to be disconnected instantly for taking up slack or for any other purpose and the fact that the teeth of each leaf or plate slant in the same direction makes it very easy to force them into the belt. This slant when the leaves are joined by the hinge pin makes it impossible for the teeth to slip out.

The advantage of the open knuckle with the leather belt overlapping the pin is, that there will always be more or less oil in the belt and this keeps the hinge pin lubricated as the pin will tend to crawl or rotate in one direction. The open knuckle also allows the ends of the belt to pass by each other and yet to rest down in so as to not form a too pronounced lump.

What we claim as our invention and desire to cover by Letters Patent is:—

1. A hinged belt buckle which consists of plates each of which is provided with teeth and each of which has tongues which interlock, registering grooves in said tongues, shoulders on said tongue, and a hinge pin detachably passed through said grooves.

2. An improved belt buckle consisting of plates having projecting teeth on the inside and squared adjoining edges, interlocking tongues which present straight abutting surfaces to the squared edges of the plates and have on the inside open grooves, curved shoulders which rise from said tongues, and a slidable hinge pin in said grooves as described.

3. An improved belt buckle, consisting of plates each of which has a flat inside surface with projecting teeth thereon, interlocking tongues from said plates each provided on the inside with open grooves which register with each other, and a hinge pin detachably passed through said grooves, combined with a belt the ends of which are so cut as to form tabs which rest on said tongues and over said hinge pin as described.

In testimony whereof we affix our signatures in presence of two witnesses.

PHILIP McHALE.
JAMES McHALE.

Witnesses:
FISHER H. PEARSON,
GARDNER H. PEARSON.